Figure 1:
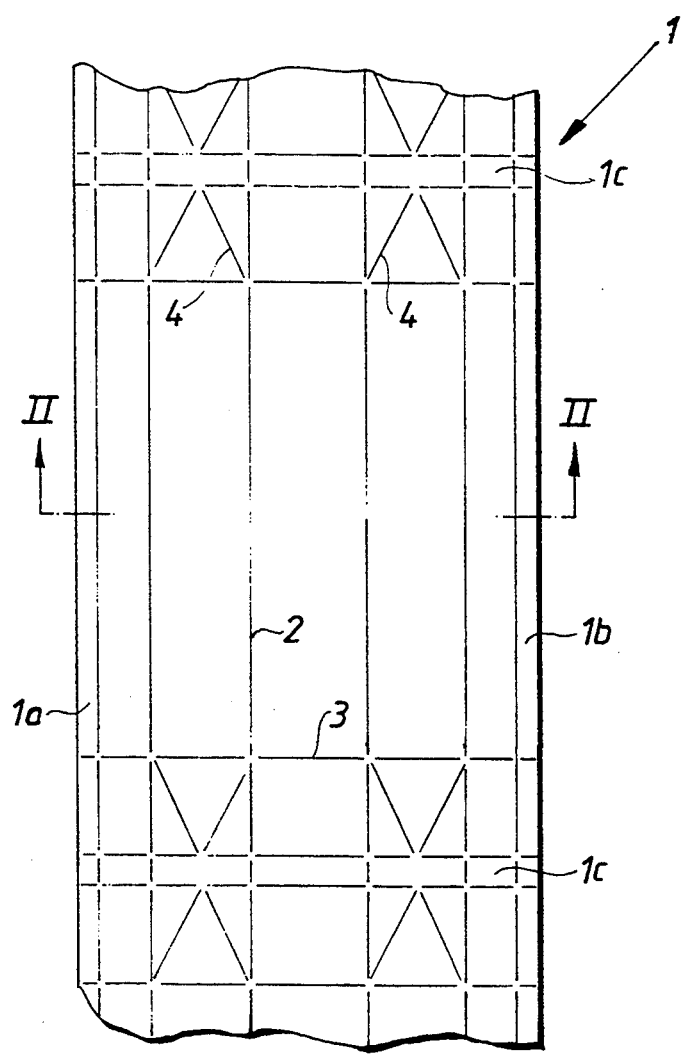

United States Patent [19]
Löfgren et al.

[11] Patent Number: 5,413,845
[45] Date of Patent: May 9, 1995

[54] LAMINATED MATERIAL WITH GAS BARRIER PROPERTIES

[75] Inventors: Lars Löfgren, Staffanstorp; Peter Frisk, Malmö, both of Sweden

[73] Assignee: Tetra Laval Holdings & Finance S.A., Pully, Switzerland

[21] Appl. No.: 860,255

[22] Filed: Mar. 31, 1992

Related U.S. Application Data

[63] Continuation of Ser. No. 452,367, Dec. 19, 1989, abandoned.

[30] Foreign Application Priority Data

Jan. 11, 1989 [SE] Sweden .................... 8900081

[51] Int. Cl.⁶ ........................... B32B 23/08
[52] U.S. Cl. ..................... 428/215; 428/476.3; 428/476.9; 428/511; 428/512; 428/520; 428/34.2; 264/176.1
[58] Field of Search ............ 428/215, 511, 512, 520, 428/476.3, 476.9

[56] References Cited

U.S. PATENT DOCUMENTS

| | | | |
|---|---|---|---|
| 4,284,674 | 9/1981 | Sheptak | 428/516 |
| 4,420,516 | 12/1983 | Ermert et al. | |
| 5,003,002 | 3/1991 | Ofstein | |
| 5,055,355 | 10/1991 | DeAntonis et al. | |

FOREIGN PATENT DOCUMENTS

| | | |
|---|---|---|
| 70559/87 | 10/1987 | Australia. |
| 104436 | 4/1984 | European Pat. Off. |
| 141555 | 5/1985 | European Pat. Off. |
| 3114771 | 10/1982 | Germany. |
| 664541 | 3/1975 | U.S.S.R. |
| 79-57147B/31 | 6/1979 | WIPO. |

*Primary Examiner*—P. C. Sluby
*Attorney, Agent, or Firm*—Burns, Doane, Swecker & Mathis

[57] ABSTRACT

A laminated material for the manufacture of packing containers with good gas barrier properties or parts for such containers.

The material (1) comprises a barrier layer (8) consisting of a mixture of amorphous polyamide and ethylene-vinyl alcohol copolymer serving as a gas barrier.

16 Claims, 3 Drawing Sheets

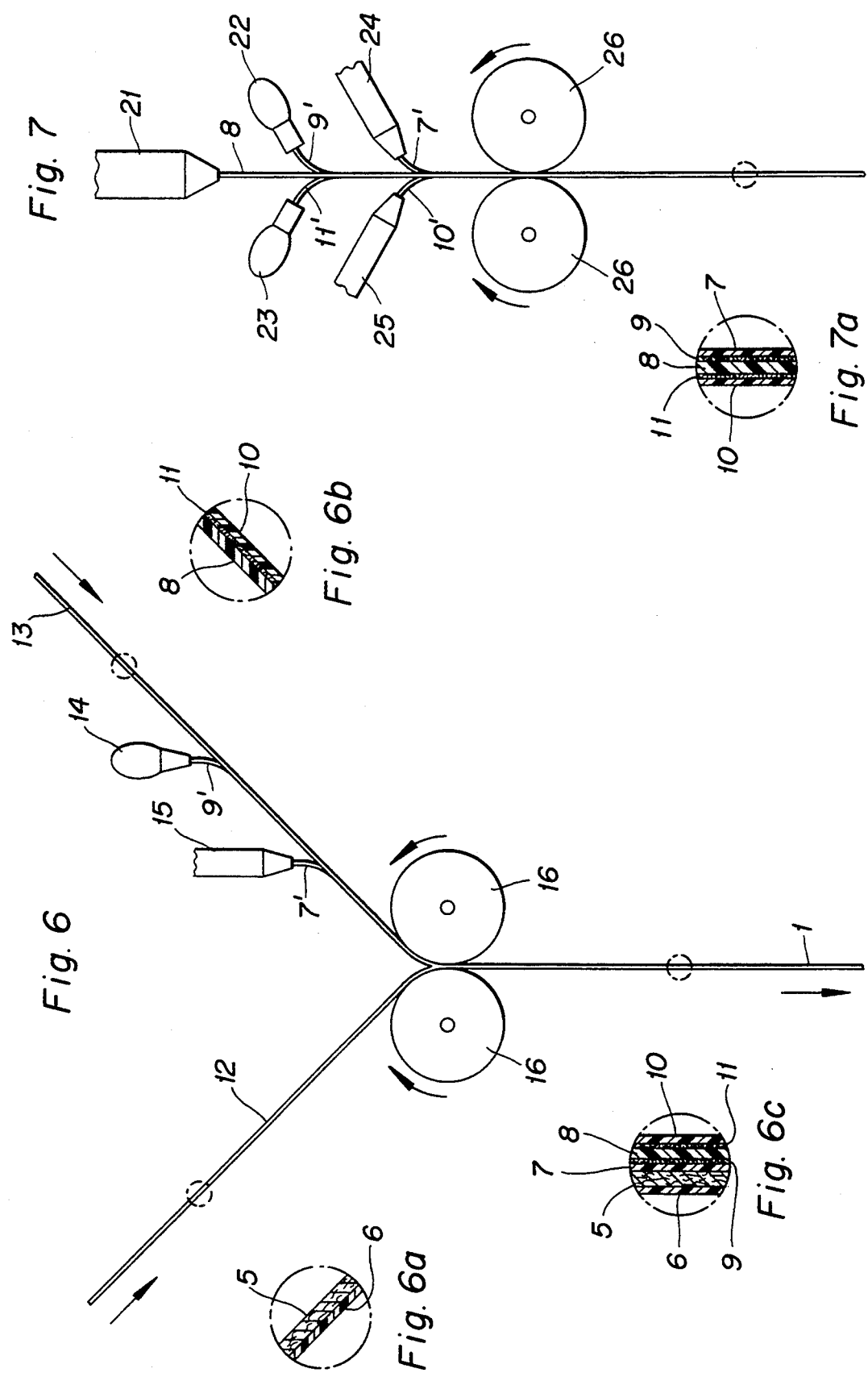

LAMINATED MATERIAL WITH GAS BARRIER PROPERTIES

This application is a continuation of application Ser. No. 07/452,367, filed Dec. 19, 1989 now abandoned.

The present invention relates to a laminated material for the manufacture of packing containers with good gas barrier properties or parts for such containers. The invention, moreover, relates to a method for the manufacture of the laminated material.

Liquid foodstuffs are packaged and transported at present in most cases in finished consumer packages of non-returnable character which are manufactured with the help of modern packing machines of the type which form, fill and seal finished packages. A very large number of these so-called one-way packages are manufactured from a web or from prefabricated blanks of a material comprising layers laminated to one another whose number and composition may vary so as to provide the finished package with the best possible protective properties for the particular contents. A conventional package for milk, for example, is manufactured from a packing material comprising one or more base layers of paper or cardboard, which give the packages the required mechanical dimensional stability, and outer coatings of thermoplastics, preferably arranged on both sides of the base layer, which on the one hand make the package liquid-tight and on the other hand make it possible by means of so-called heat-sealing for the packages to be made permanent in their intended final geometric shape, in that thermoplastic-coated material zones facing one another, by simultaneous supply of heat and pressure, are made to surface-fuse with one another so as to form liquid-tight, mechanically strong sealing joints.

The known packing material described does not, however, have tightness properties towards gases and cannot, therefore, be used for the manufacture of packages for contents sensitive to oxygen gas or oxidation such as wine, juice etc. which already after a very short time undergo oxidation reactions and deteriorate or are destroyed if they are subjected to the effect of oxygen. The known packing material, therefore, has to be complemented by at least one further layer of a material with good gas barrier properties, which up to now usually meant that the side of the packing material which during the manufacture of the package is facing towards the inside of the package is provided with a thin, fully covering foil of aluminium (Al-foil). Such an Al-foil provides the package with the necessary gas barrier properties, and so as to avoid direct contact between the Al foil and the contents of the package, the inside of the Al foil is covered with a thin protective coating of thermoplastics, usually polythene, serving as a sealing layer. Packages manufactured from such a complemented packing material as a rule function satisfactorily and make possible in most cases a long-term packaging of contents sensitive to oxygen gas or oxidation with good keeping quality, but the problem with these known, gas-tight packing materials always has been that an Al-foil is very sensitive to tension because of its low extensibility and therefore tends to crack if during the conversion of the material to packages the strains on the material become excessive. Especially critical are those regions along which multiple material layers are folded over one another, so-called crosses, where the strains may even become so great that not only the Al-foil, but also the thermoplastic coatings included in the material, burst with serious deteriorations of the tightness characteristics of the finished packages as a consequence.

It is also known to provide a laminated material of the type described above with a gas barrier layer of polymer material, e.g. ethylene-vinyl alcohol copolymer (EVOH), but such materials as a rule are very sensitive to moisture and lose rapidly their gas-tightness properties if exposed to moisture.

It is an object of the present invention, therefore, to provide directions regarding a new laminated material of the type described in the introduction for the manufacture of packing containers with good gas barrier properties or parts for such containers, without, or with negligible, risk of bursts in the material during its conversion to packing containers.

It is another object to provide a packing material with good gas barrier properties which has no moisture-sensitive gas barrier layer or is affected only negligibly by moisture.

These objects are achieved in accordance with the present invention in that a laminated material of the type described above has been given the characteristic that it comprises a barrier layer of a mixture of ethylene-vinyl alcohol copolymer and amorphous polyamide serving as a gas barrier.

Amorphous polyamides, e.g. amorphous nylon, in themselves have tightness properties towards gases which certainly are somewhat inferior to the corresponding properties of ethylene-vinyl alcohol copolymer, but unlike ethylene-vinyl alcohol polymer amorphous polyamides acquire enhanced gas-tightness properties in moist environments and constitute, therefore, in mixture with the moisture-sensitive ethylene-vinyl alcohol copolymer a valuable complementary protection which effectively compensates, or in any case favourably contributes to a minimizing of, the loss in gas-tightness which the barrier layer in the material in accordance with the invention undergoes if the material because of excessively strong strains happens to burst or in some other manner makes the ethylene-vinyl alcohol copolymer component of the barrier layer accessible to moisture.

The mixture ratio based on weight between the two components entering the barrier layer may vary within wide limits while retaining a good gas-tightness or a capacity for self-compensating losses of gas-tightness, and practical experiments carried out up to now with the material in accordance with the invention have shown that a mixture ratio of, for example, 1:1 functions well and gives a packing material with sufficiently good gas-tightness properties to make possible a long-term packaging of contents sensitive to oxygen gas or oxidation such as wine and juice with good keeping quality.

The invention will now be described in greater detail with special reference to the attached drawings, wherein FIG. 1 shows schematically a part of a weblike packing material in accordance with the invention.

Figure 2:
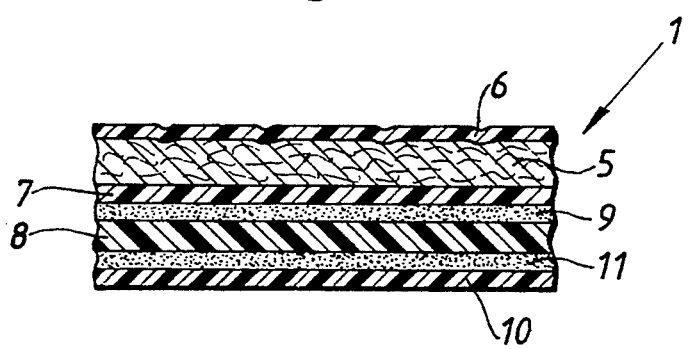
Figure 3:
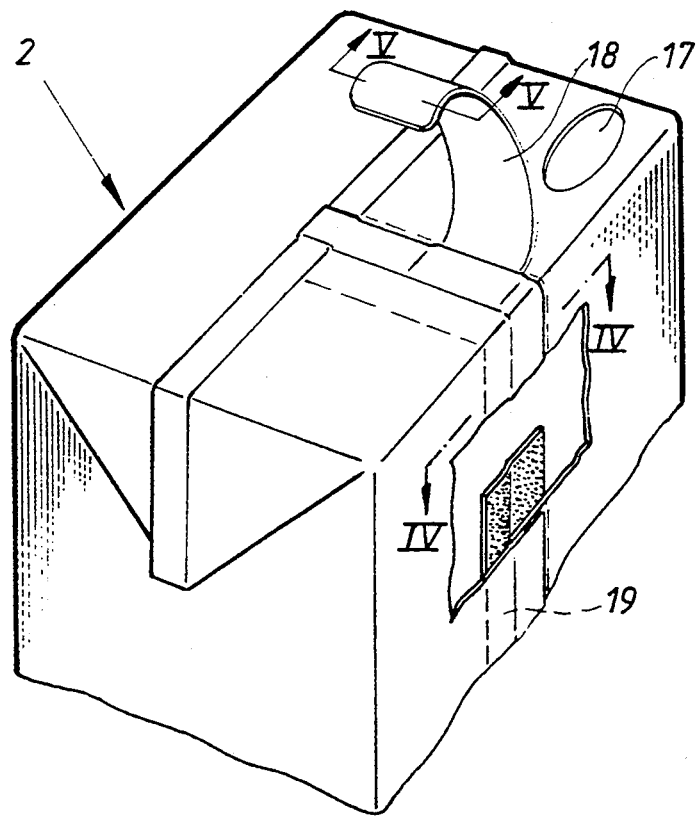
Figure 4:
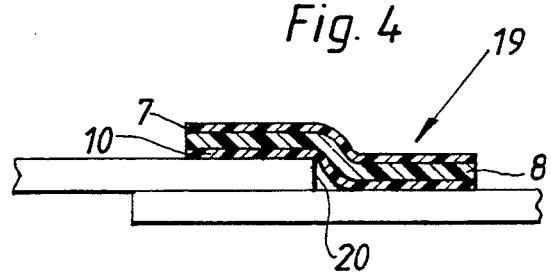
Figure 5:
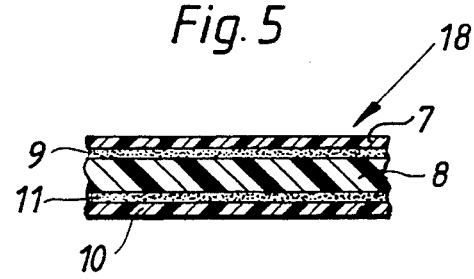

FIG. 2 is an enlarged cross-section along the line II—II in FIG. 1,

FIG. 3 shows the top part of a conventional packing container which has been manufactured from, and has been provided with separate parts of, a material in accordance with the invention, FIG. 4 is a cross-section along the line IV—IV in FIG. 3, FIG. 5 is a cross-section along the line V—V in FIG. 3, FIG. 6 illustrates schematically a method for the manufacture of the material in accordance with FIGS. 1 and 2, and FIG. 7 shows schematically a method for the manufacture of a material in accordance with the invention for the separate container parts shown in FIG. 3.

FIG. 1 thus shows schematically a portion corresponding to a whole package length of a web 1 of a laminated material in accordance with the invention for the manufacture of packing containers (FIG. 3) with good gas barrier properties. From the web 1, which is provided with an arbitrary pattern of crease lines 2–4 facilitating the fold forming, packages 2 (FIG. 3) are made in accordance with known technique in that two longitudinal edge zones 1a and 1b of the web are combined with one another in a longitudinal overlap joint so as to form a tube. The tube is filled with the desired contents and is divided into closed packing units by means of repeated flattening and sealing of the tube along transverse zones 1c. The packing units are separated from one another by means of cuts in the transverse zones 1c and are given the desired final geometric shape, usually a parallelepiped, with the help of a further forming and sealing operation during which the double-walled triangular corner lugs of the cushionlike package units are folded in against, and are sealed to, the outside of the packages.

The web 1 is manufactured from a material which is shown in greater detail in FIG. 2 and which in accordance with the invention comprises a base layer 5 of paper or cardboard providing stiffness, and thin liquid-tight coatings 6 and 7 of thermoplastics, e.g. polythene, applied to both sides of the base layer. To the one thermoplastic coating 7 which is intended to be facing inwards towards the inside of the finished package 2, is applied a barrier layer 8 which consists of a mixture of amorphous polyamide and ethylene-vinyl alcohol copolymer in a mixture ratio based on weight of 1:1 and which serves as a gas barrier. The barrier layer 8 is joined with good adhesion to the thermoplastic coating 7 by means of an intermediate layer 9 of suitable bonding agent, e.g. an adhesive of the modified polyolefin type which presents good adhesion to the thermoplastic coating 7 as well as to the barrier layer 8. The inside of the barrier layer 8 is covered with a thin, protective coating 10 of thermoplastic, e.g. polythene, which is bonded to the barrier layer 8 by means of an intermediate layer 11 of suitable bonding agent, e.g. an adhesive of the modified polyolefin type. For the sake of clearness it ought to be pointed out that the cross-section shown in FIG. 2 is intended only to illustrate the mutual placing of the individual layers included in the a material, without claiming at the same time to reproduce correctly the mutual material thicknesses of the individual layers in a true-to-scale relationship. Rightly speaking the paper or cardboard layer 5 should be appreciably greater than, for example, the said gas barrier layer 8, which in accordance with the invention has a material thickness of up to 20 $\mu$m whereas the material thickness of the layer 5 is of the order of magnitude of 100–300 $\mu$m.

In accordance with FIG. 6 the weblike material 1 in accordance with the invention is manufactured from a first prefabricated laminated web 12 comprising a base layer 5 of paper or cardboard and a coating 6 of thermoplastics arranged on the one side of the base layer, and a second prefabricated, laminated web 13 comprising an extruded barrier layer 8 of a mixture of amorphous polyamide and ethylene-vinyl alcohol copolymer and a protective coating 10 of thermoplastics arranged on the one side of the barrier layer which by means of an intermediate layer 11 of bonding agent is joined with good adhesion to the barrier layer 8. The barrier layer side of the second web 13 is coated with a layer 9' of bonding agent with the help of an applicator 14, and the layer of bonding agent applied is covered by a thin film 7' of thermoplastics which is extruded from an extruder 15. The first web 12 and the second web 13 so coated are brought together, the base layer 5 of the web 12 facing towards the film-coated barrier layer 8 of the second web 13, and are conducted through the nip between a pair of cooperating, counterrotating cylinders 16 by means of which the two webs are lastingly joined to one another so as to form the finished packing material web 1 in accordance with the invention.

Packing containers 2 of the type shown in FIG. 3 may be provided with an emptying opening 17 present in the wall of the package, generally close to a corner region in the top side of the package, in order to facilitate access to, and make possible a comfortable pouring out of, the contents of the package. Such a prepared emptying opening 17 is covered in most cases with a pull strip 18 (or so-called pull-tab) applied to the outside of the package, which is placed against, and is attached with good adhesion to, the outside of the package in a liquid-tight, breakable seal around the whole area of the opening.

The strip 18 consists in accordance with the invention of a laminated material which according to FIG. 5 comprises a barrier layer 8 of a mixture of amorphous polyamide and ethylene-vinyl alcohol copolymer and which on both sides is covered by thin coatings 7 and 10 respectively of thermoplastics, e.g. polythene, which are joined with good adhesion to the barrier layer 8 with the help of intermediate layers 9 and 11 respectively of suitable bonding agent, e.g. an adhesive of the modified polyolefin type.

The packing container 2, moreover, comprises, as is evident from the exposed region in FIG. 3, a separate strip 19 applied to the inside of the package which is intended to protect the free cut edge 20 (FIG. 4) internally along the longitudinal overlap joint formed during the manufacture of the package along which the longitudinal edge zones 1a and 1b of the web 1 are joined to one another. The strip 19 (so-called LS strip) too is manufactured from a laminated material which according to the invention comprises a central barrier layer 8 of a mixture of amorphous polyamide and an ethylene-vinyl alcohol copolymer and outer coatings 7 and 10 respectively of thermoplastics, e.g. polythene bonded to the two sides of the barrier layer 8. To improve the adhesion between the barrier layer 8 and the outer coatings 7 and 10 further layers (not shown) of suitable bonding agent, e.g. an adhesive of the modified polyolefin type, are arranged here too between the barrier layer and the coatings.

The separate package parts 18 and 19 in accordance with the invention which have been described are manufactured according to FIG. 7 which illustrates the manufacture of the pull-strip 18 shown in more detail in FIG. 5, in that a mixture of amorphous polyamide and ethylene-vinyl alcohol copolymer is extruded by means of an extruder 21 fitted with a die to form a film serving as barrier layer 8 which is coated on both sides with a thin layer 9' and 11' respectively of suitable bonding agent with the help of bonding agent applicators 22 and 23 respectively. Onto the barrier layer 8 coated with bonding agent are extruded, outer coatings 7' and 10' respectively of thermoplastics, e.g. polythene, with the help of extruders 24 and 25 respectively as a cover, and the laminate coated with thermoplastics is passed through the nip between a pair of cooperating, counter-rotating cylinders 26 with the help of which all the material layers included in the laminate are lastingly joined to one another to form the finished material according to the invention for the said package parts, that is to say the pull-tab 18 (and the LS strip 19). The laminated strip material thus is easy to produce by using conventional, uncomplicated equipment and, owing to the barrier layer, possesses good tightness properties towards gases and can be used advantageously for package parts on packing containers for contents sensitive to oxygen gas or oxidation such as wine, juice etc.

We claim:

1. A laminated material comprising:
   a base layer of paper or cardboard, and
   a barrier layer consisting essentially of a mixture of ethylene-vinyl alcohol copolymer and amorphous polyamide.

2. The laminated material of claim 1, wherein the base layer has a coating of a thermoplastic material applied to each side of the base layer.

3. The laminated material of claim 2, wherein an intermediate layer of bonding agent joins one side of the base layer coated with thermoplastic coating to the barrier layer.

4. The laminated material of claim 3, wherein the bonding agent is a modified polyolefin.

5. The laminated material of claim 1, wherein the barrier layer is extruded.

6. The laminated material of claim 1, wherein the barrier layer mixture contains substantially equal proportions of ethylene-vinyl alcohol copolymer and amorphous polyamide.

7. The laminated material of claim 1, wherein the barrier layer has a thickness of up to 20 $\mu$m.

8. The laminated material of claim 1, wherein the base layer has a thickness of 100 to 300 $\mu$m.

9. A laminated material comprising layers bonded to each other, comprising:
   a base layer of paper or cardboard, and
   a barrier layer consisting essentially of a mixture of ethylene-vinyl alcohol copolymer and amorphous polyamide.

10. The laminated material of claim 9, wherein the base layer has a coating of a thermoplastic material applied to each side of the base layer.

11. The laminated material of claim 9, wherein an intermediate layer of bonding agent joins one side of the base layer coated with thermoplastic coating to the barrier layer.

12. The laminated material of claim 11, wherein the bonding agent is a modified polyolefin.

13. The laminated material of claim 9, wherein the barrier layer is extruded.

14. The laminated material of claim 9, wherein the barrier layer mixture contains substantially equal proportions of ethylene-vinyl alcohol copolymer and amorphous polyamide.

15. The laminated material of claim 9, wherein the barrier layer has a thickness of up to 20 $\mu$m.

16. The laminated material of claim 9, wherein the base layer has a thickness of 100 to 300 $\mu$m.

* * * * *